United States Patent [19]

Hamilton

[11] Patent Number: 4,958,861
[45] Date of Patent: Sep. 25, 1990

[54] TUBE COUPLING

[75] Inventor: Jerry W. Hamilton, Desoto, Tex.

[73] Assignee: Atco Products, Inc., Ferris, Tex.

[21] Appl. No.: 197,672

[22] Filed: May 23, 1988

[51] Int. Cl.$^5$ ............................................. F16L 55/00
[52] U.S. Cl. .................................... 285/175; 285/365; 285/420; 285/3
[58] Field of Search ............... 285/365, 407, 408, 239, 285/921, 411, 3, 4, 175

[56] References Cited

U.S. PATENT DOCUMENTS

| | | | |
|---|---|---|---|
| 1,994,784 | 3/1935 | Porzel | 285/239 |
| 2,675,253 | 4/1954 | Stade | 285/408 |
| 2,801,116 | 7/1957 | Herman et al. | 285/408 X |
| 2,842,385 | 7/1958 | Webster et al. | 285/411 |
| 2,914,344 | 11/1959 | Anthes . | |
| 2,939,728 | 6/1960 | Bitel . | |
| 3,304,104 | 2/1967 | Wiltse . | |
| 3,453,005 | 7/1969 | Foults . | |
| 3,532,101 | 10/1970 | Snyder . | |
| 3,569,903 | 3/1971 | Brishka . | |
| 3,825,041 | 7/1974 | Cornog | 285/365 X |
| 3,924,883 | 12/1975 | Frank . | |
| 3,929,357 | 12/1975 | DeVincent et al. . | |
| 3,966,238 | 6/1976 | Washkewicz et al. | 285/239 |
| 4,055,359 | 10/1977 | McWethy . | |
| 4,171,834 | 10/1979 | Abner | 285/921 X |
| 4,708,377 | 11/1987 | Hunting | 285/407 |

FOREIGN PATENT DOCUMENTS

| | | | |
|---|---|---|---|
| 511690 | 12/1953 | Belgium | 285/407 |
| 1277984 | 4/1962 | France . | |
| 35643 | 10/1971 | Japan | 285/407 |

Primary Examiner—Dave W. Arola
Attorney, Agent, or Firm—Gerald G. Crutsinger; John F. Booth; Norman L. Gundel

[57] ABSTRACT

A tube coupling comprising a first and second tubular member the first tubular member having a bell end and the second tubular member having a pin end for telescopic engagement within the bell end of the first tubular member. A deformable band secures the first and second tubular members in telescopic engagement and prevents relative movement therebetween. Each tubular member is provided with an annular ridge. These ridges are juxtaposed when the first and second tubular members are telescopically engaged. A deformable band having a longitudinal groove formed therein has a connector loop at one end; and a projection extending outwardly from the opposite end. The band is detachably securable around the telescopically engaged tubular members. The connector loop and projection of the deformable band cooperate to tightly secure the band around the telescopically engaged tubular members, trapping the annular ridges within a longitudinal groove, for preventing relative movement of the tubular member.

10 Claims, 3 Drawing Sheets

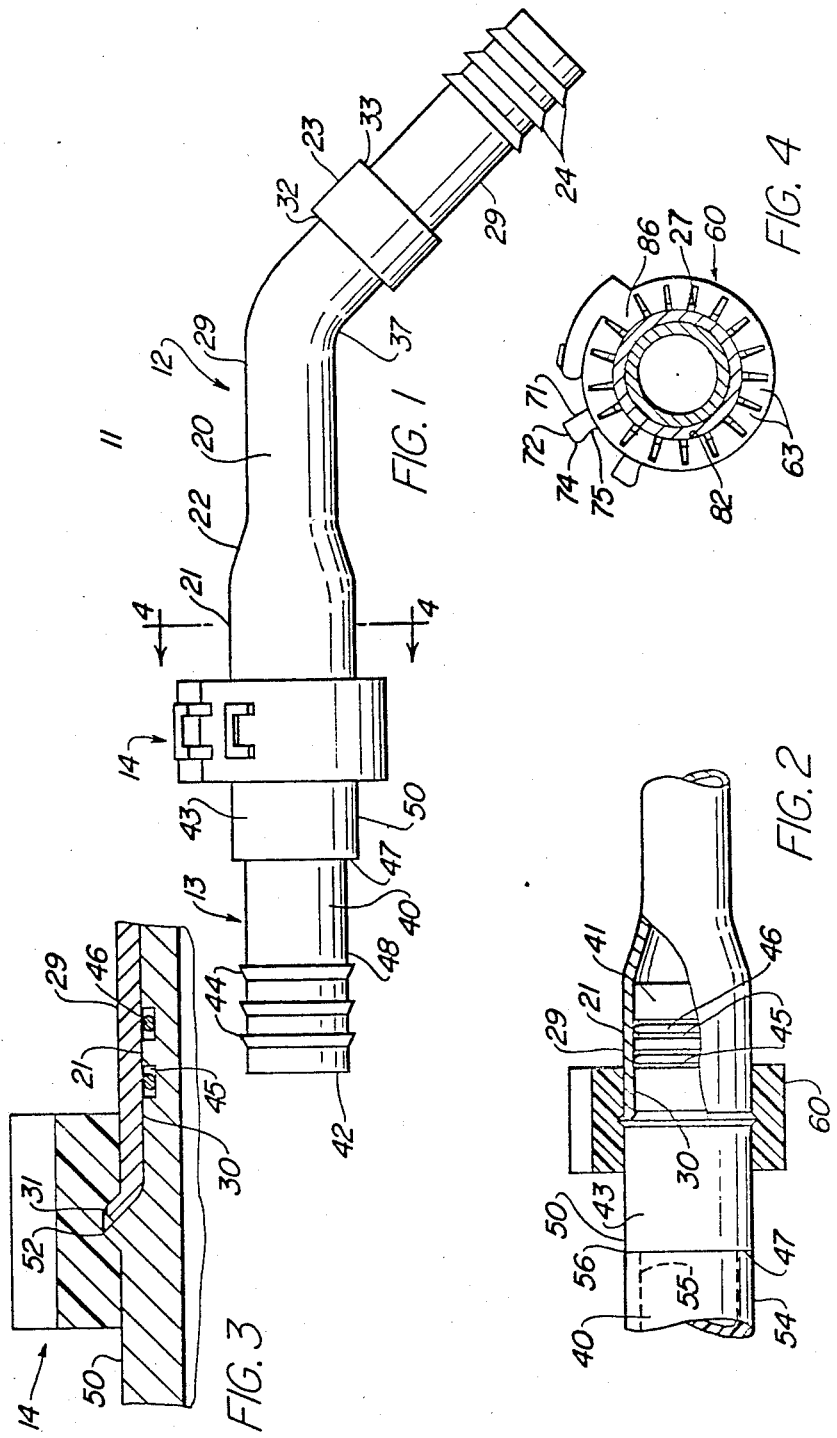

TUBE COUPLING

FIELD OF THE INVENTION

The invention relates to a coupling device facilitating the connection and disconnection of tubular conduits for pressurized fluids or gases.

BACKGROUND OF THE INVENTION

Tubular conduits carrying pressurized fluids and gases are integral components in many automotive, machine tool, and household appliance applications and must be capable of being connected and disconnected quickly to facilitate repair or replacement of components in the system. Facilitating this connection/disconnection requirement, a number of tubular couplings have been developed as exemplified by the disclosures of U.S. Pat. No. 4,055,359 for "QUICKCONNECT TUBULAR COUPLINGS"; U.S. Pat. No. 3,924,885 for "HOSE COUPLING"; U.S. Pat. NO. 3,929,357 for "QUICK CONNECT COUPLING WITH TANDEM SNAP RIGS"; and U.S. Pat No. 3,453,005 for "QUICK-CONNECT SAFETY COUPLING".

These types of couplings represent relatively complex and expensive solutions to the problem of coupling tubular conduits. Prior art developments have established criteria by which the design of tubular couplings are often evaluated. These as listed in U.S. Pat. No. 4,055,359 include but are not limited to the following: (a) connect/disconnect assembly time must be significantly reduced over currently available fittings; (b) connection should be accomplished by a hand push; (c) the cost of components must be as low as possible and is to be achieved in part by the elimination of screw parts; (d) the coupling must weigh less than the current fittings available; (e) the "O" ring must be visible during connect/disconnect operations and secured in a groove to avoid warranty rework because of missing "O" rings; (f) less dependence on human factor during assembly thereby anticipating reliability improvements and warranty cost reduction; (g) coupling must have no rotary orientation requirement, thereby allowing hose assembly to neutralize all torsional stresses in the system; and (h) the design must have no threads, thereby eliminating cross threading.

Several prior art couplings in an attempt to meet other important design criteria have required the use of special tools for connecting or disconnecting couplings.

The requirement that disconnection cannot be accomplished without the use of specialized tools or destruction of the coupling is a major shortcoming of couplings heretofore devised.

SUMMARY OF THE INVENTION

The present invention relates to a tube coupling comprising first and second tubular members, formed such that a pin end on the second tubular member is telescopically received within a bell end on the first tubular member. Both tubular members are provided with annular ridges which are juxtaposed when the pin end of the second tubular member is telescopically disposed within the first tubular member. A deformable band having a longitudinally extending groove, a connector loop and a plurality of spaced projections, is detachably securable around the telescopically disposed tubular members to trap the annular ridges on the tubular members within the longitudinal groove of the deformable band, thereby preventing relative movement of the first and second tubular members. The band is secured in position by latching one of the projections on the band into the connector loop.

At least one O-ring is secured within an annular groove formed in the second tubular member and positioned to be held in pressure indented relation between the inside wall of the first tubular member and the telescopically disposed pin end of the second tubular member for providing an effective seal to prevent leakage between the tubular members. The free ends of each tubular member are provided with a plurality of annular barbs for grippingly engaging a resilient wall tubing such as a conventional rubber hose.

The tube coupling of the present invention requires no particular rotary orientation, has no threaded parts, does not significantly restrict the flow of fluids or qases, is connectable by a hand push, and is disconnectable by disengaging the deformable band with an ordinary screwdriver or similar tool.

BRIEF DESCRIPTION OF DRAWINGS

Drawings of a preferred embodiment of the invention are annexed hereto so that the invention may be better and more fully understood, in which:

FIG. 1 is an elevational view illustrating the relationship of the coupling parts in the assembled condition;

FIG. 2 is a partially sectionalized elevational view illustrating the relationship of the coupling parts in the assembled condition;

FIG. 3 is an enlarged partially sectionalized view illustrating the relationship of the coupling parts in the connected condition;

FIG. 4 is a cross-sectional view taken along line 4—4 of FIG. 1 illustrating the flexible band clamp in the secured condition;

Numerical references are employed to designate like parts throughout the various figures of the drawing.

DESCRIPTION OF A PREFERRED EMBODIMENT

Figure 5:
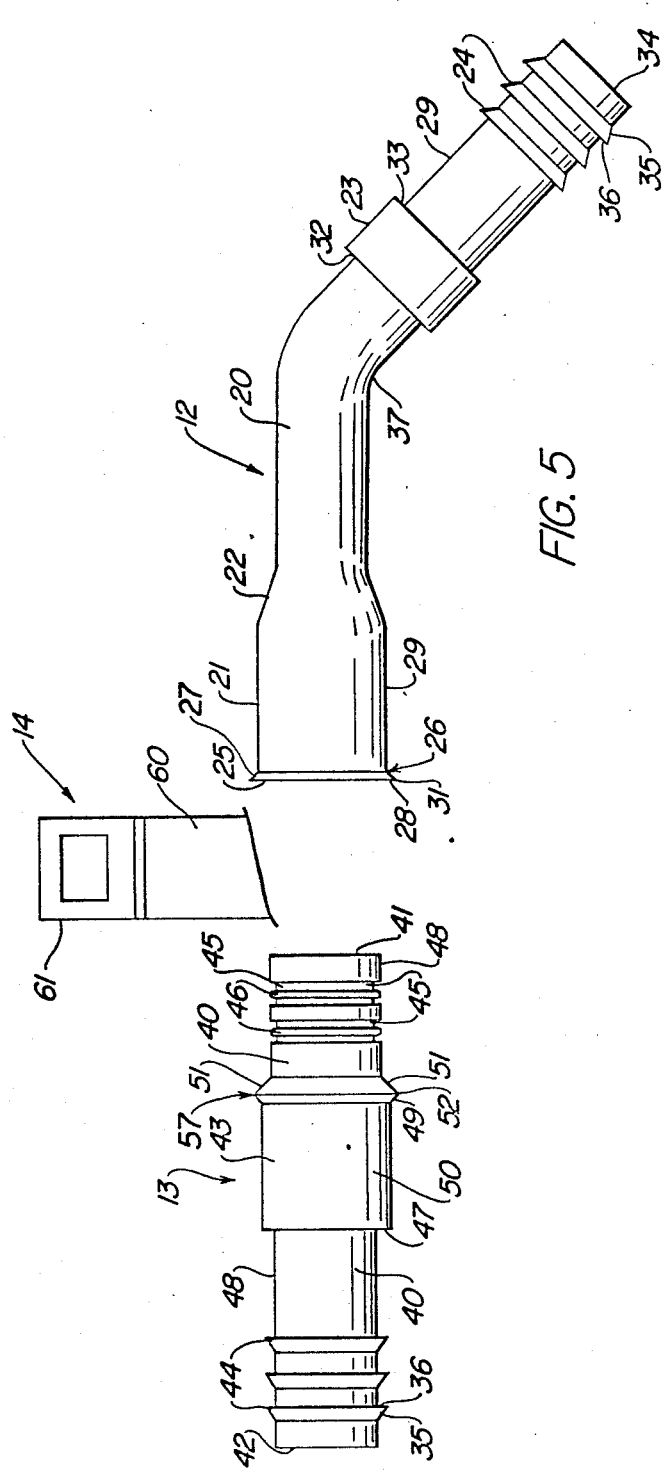
FIG. 5 is an exploded view of the tube coupling.

Referring to FIGS. 1, 2 and 5 of the drawing, a preferred embodiment of the tube coupling of the present invention is generally designated by the numeral 11 and comprises a first tubular member 12, a second tubular member 13, and a deformable band 14.

First tubular member 12 comprises a tubular body 20 having a barbed free end 34 and an enlarged bell end 21, as will be hereinafter more fully explained. A tapering transition section 22 is formed intermediate the free end 34 and the bell end 21 of the body 20 of tubular member 12. The enlarged bell end 21 of first tubular member 12 has substantially greater inside and outside diameters than tubular body 20 with tapering transition section 22 bridging the differences therebetween. Enlarged bell end 21 is outwardly flared immediately adjacent to opening 25, forming an annular ridge 26, having an inclined shoulder 27, a crest 31 and an inwardly tapering lip 28. Shoulder 27 and tapering lip 28 are substantially parallel to each other and disposed in obtuse angular relation to outer wall 29 and inner wall 30 respectively of first tubular member 12. Shoulder 27 and tapering lip 28 extend outwardly from bell end portion 21 adjacent opening 25 and terminate to form crest 31.

Tubular body 20 of first tubular member 12 has an annular collar 23 having shoulders 32 and 33. Shoulders 32 and 33 are perpendicularly disposed relative to outer wall 29 of first tubular member 12. Annular collar 23 is positioned between and in spaced apart relation to enlarged bell end 21 and annular barbs 24 and is employed to position barbs 24 in a hose for connection by a hose clamp or crimped connector, as will be hereinafter more fully explained.

A plurality of spaced apart annular barbs 24 extend outwardly from outer wall 29 of first tubular member 12 adjacent free end 34. Annular barbs 24 have inclined front faces 35 and rear portions 36, front faces 35 being aligned in parallel relation to each other and disposed in obtuse angular relation to outer wall 29. Rear portions 36 of annular barbs 24 are perpendicular to outer wall 29. Annular barbs 24 are arranged in spaced apart relation and aligned such that the inclined face 35 of each barb 24 is more proximate free end 34 than corresponding rear portion 36 of each annular barb 24. Rear portion 36 of each annular barb 24 is aligned and parallel with shoulder 33 and positioned more proximately therewith than the corresponding inclined face 35 of each annular barb 24 to dig into the inner wall of a hose.

In the illustrated embodiment, first tubular member 12 is provided with a directional tubing bend 37 between transition section 22 and annular collar 23. It will of course be appreciated by those skilled in the art that first tubular member 12 may be straight or bent in a variety of angles to more conveniently accommodate particular plumbing requirements without departing from the scope and spirit of the invention.

First tubular member 12 is adapted to be connectable to tubing at its free end 34. Annular barbs 24 grippingly engage a resilient tube wall 55 when an end 56 of resilient tube 54 is slidably positioned over and around outer wall 29 to engage shoulder 33. When the end of the resilient tube engages shoulder 33 on collar 23, the tube and barbs are properly positioned for connection by conventional hose clamps or crimped connectors.

Second tubular member 13 comprises a tubular body 40 having a pin end 41, a free end 42, an annular collar 43 and a plurality of annular barbs 44. As best shown in FIGS. 1, 2 and 5 of the drawing, tubular body 40 of second tubular member 13 is provided with at least one annular groove 45 having an 0-ring 46 secured therein. Annular grooves 45 are positioned between annular collar 43 and pin end 41. Tubular body 40 has an outside diameter slightly less than the inside diameter of bell end 21 of first tubular member 12 to provide for telescopically positioning pin end 41 of tubular member 40 within bell end 21 of first tubular member 12.

Annular collar 43 is positioned between and in spaced apart relation to annular barbs 44 and annular grooves 45. Annular collar 43 has a shoulder 47 perpendicularly disposed relative to the outer wall 48 of tubular body 40. Shoulder 47 forms the side of annular collar 43 most proximate to the free end 42 of second tubular member 13 and functions as a stop to position a resilient hose.

As best illustrated in FIG. 5, an annular ridge 57 is formed by inclined surfaces 49 and 51 which intersect at a crest 52. Surface 49 is disposed in obtuse angular relation to the outer surface 50 of annular collar 43 and has the same dimensions and degree of angle as shoulder 27 on tubular body 20. Crest 52 has a diameter identical to that of crest 31 on first tubular member 12. An inclined transition shoulder 51 extends from crest 52 to outer wall 48 of tubular body 40; transition shoulder 51 being positioned between annular collar 43 and annular grooves 45. Transition shoulder 51 has identical dimensions and degree of angle as lip 28 of first tubular member 12.

A plurality of annular barbs 44 extend outwardly from outer wall 48 of tubular body 40 adjacent free end 42. Annular barbs 44 have inclined front faces 35 and rear portions 36; front faces 35 being aligned in parallel relation to each other and disposed in obtuse angular relation to outer wall 48. Rear portions 36 of annular barbs 44 are perpendicularly disposed relative to outer wall 48.

Annular barbs 44 are arranged in spaced apart relation and aligned such that the inclined face 35 of each barb 44 is more proximate the free end 42 than the corresponding rear portion 36 of each barb 44. Rear portion 36 of each barb 44 is aligned in parallel with shoulder 47 and positioned more proximately therewith than the corresponding inclined face 35 of each barb 44.

Second tubular member 13 is adapted to be connectable to tubing at its free end 42, annular barbs 44 grippingly engaging a resilient tube wall 55 when an end 56 of resilient tube 54 is slidably positioned over and around outer wall 48 to engage shoulder 47. When the end of the resilient tube engages shoulder 47 on collar 43, the tube and barbs are properly positioned for connection by conventional hose clamps or crimped connectors, shoulder 47 functioning as a stop for positioning a resilient hose.

Deformable band 14 comprises a flexible strap 60 having a connector loop 61, at least one projection 62, a plurality of ribs 63 and a longitudinal groove 64.

As best illustrated in FIGS. 6-10 of the drawing, flexible strap 60 has a substantially flat top surface 65, an integrally formed connector loop 61 at the free end 68 of strap 60; and at least one projection 62 extending outwardly from top surface 65 adjacent the terminal end 66 of strap 60. Connector loop 61 has an outwardly inclined shoulder 67 disposed in obtuse angular relation to top surface 65 of flexible strap 60 adjacent free end 68; and curved buckle 69 having a square or rectangular shaped hole 70 centrally disposed therein.

At least one projection 62 extends outwardly from top surface 65 of strap 60. Each projection 62 has a rear shoulder 71, a substantially flat crown 72, and a corrugated shoulder 73.

Figure 6:
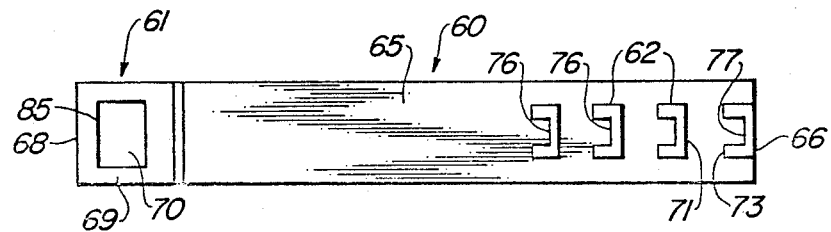
FIG. 6 is a top plan view of the flexible band clamp.
Figure 7:
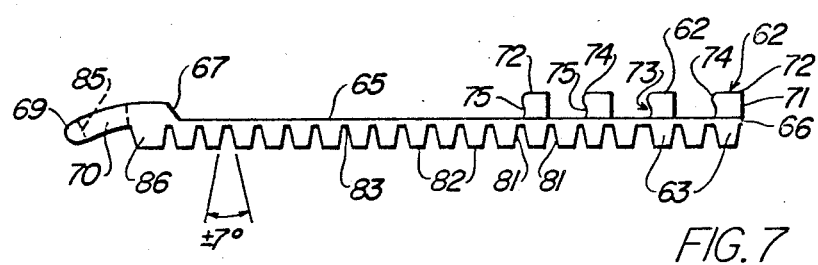
FIG. 7 is a side elevation view of the flexible band clamp.
Figure 8:
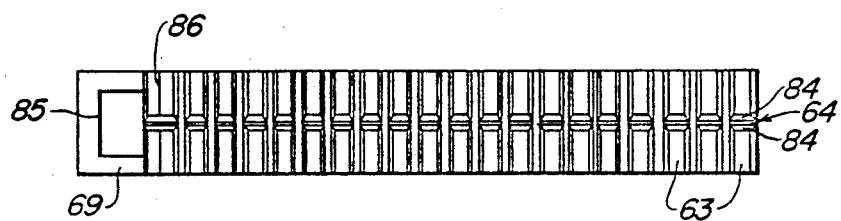
FIG. 8 is a bottom view of the flexible band clamp.

Rear shoulder 71 is perpendicularly disposed relative to top surface 65. Corrugated shoulder 73, although relatively perpendicular to top surface 65, has an undulating surface comprising a rounded knob 74 adjacent crown 72, a rounded depression 75 adjacent top surface 65, and a notch 76. As best shown in FIGS. 7 and 8 of the drawing, knob 74 extends longitudinally from corrugated shoulder 73 toward free end 68 of strap 60. Depression 75, in direct contrast to knob 74, extends longitudinally toward the terminal end 66 of strap 60; depression 75 being positioned between knob 74 and top surface 65. As best shown in FIG. 6 of the drawing, notch 76 is centrally disposed along corrugated shoulder 73, dividing the surface of corrugated shoulder 73 and extending from crown 72 to top surface 65. Rear wall 77 of notch 76 is perpendicularly disposed relative to top surface 65.

Figure 9:
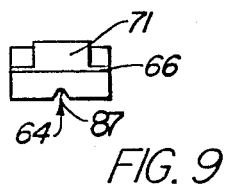
FIG. 9 is a front elevation of the flexible band clamp.
Figure 10:
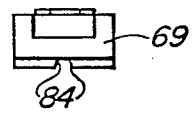
FIG. 10 is a rear elevation of the flexible band clamp.

Turning to FIGS. 8-10 of the drawing, the underside of strap 60 has a corrugated surface formed by a plurality of uniformly tapered ribs 63. Ribs 63 extend outwardly from strap 60 in perpendicular relation to central axis 80 and have substantially converging inclined sidewalls 81 and a substantially flat end surface 82.

Ribs 63 are positioned in uniform spaced apart relation along strap 60 such that sidewalls 81 of adjacent ribs 63 are separated by an intermediate portion 83 of strap 60. According to a preferred embodiment, sidewalls 81 of adjacent ribs 63 are oppositely inclined in acute angular relation relative to each other, the degree of angle being ±7°. The width of intermediate portion 83 as measured along central axis 80 between sidewalls 81 of adjacent ribs 63 is substantially less than the distance between sidewalls 81 of adjacent ribs 63 as measured the convergence points of sidewalls 81 and end surface 82.

A wedge shaped longitudinal groove 64 interrupts and divides end surfaces 82 longitudinally along central axis 80; longitudinal groove 64 having inclined opposing sidewalls 84 disposed in acute angular relation to each other and an inner wall 87. The degree of angle formed by opposing sidewalls 84 is substantially equal to the additive sum of the degree of angle between shoulder 27 and outer wall 29 plus the degree of angle between shoulder 49 and outer surface 50, as will be hereinafter discussed.

Referring to FIGS. 1-4 of the drawing, the tube coupling of the present invention is illustrated in the "coupled condition". Pin end 41 of second tubular member 13 is slidably positioned within bell end 21 of first tubular member 12 such that resilient 0-rings 46 are held in pressure indented relation between inner wall 30 of first tubular member 12 and second tubular member 13 secured within annular grooves 45, and transition shoulder 51 contacts lip 28. The telescopic engagement of pin end 41 of second tubular member 13 within bell end 21 of first tubular member 12 positions crest 31 and crest 52 adjacent to each other.

Flexible strap 60 is tightly fastened circumferentially around telescopically engaged tubular members 12 and 13 such that annular ridges 26 and 57 are grippingly engaged between opposing sidewalls 84 within longitudinal groove 64 of strap 60 and outer walls 29 and 50 of tubular members 12 and 13 are grippingly engaged by end surfaces 82 of ribs 63. When flexible strap 60 is secured around telescopically engaged tubular members 12 and 13, opposing walls 84 of longitudinal groove 64 grippingly engage shoulders 27 and 49 and inner wall 87 grippingly engages crests 31 and 52. Strap 60 is tightly secured about tubular members 12 and 13 by hooking connector loop 61 over projection 62 in such a fashion as to engage locking surface 62 within depression 75. The tight gripping engagement of opposing sidewalls 84 against shoulders 27 and 49 prevents relative movement of tubular members 12 and 13.

According to a preferred embodiment, projection 62 and locking surface 85 are positioned at a predetermined distance apart along strap 60 for providing a tight fitting engagement around telescopically engaged tubular members 12 and 13; strap 60 being securable by hand push and detachable by insertion of a screwdriver in notch 76 for prying locking surface 85 out of depression 75 and outwardly beyond knob 74, thereby disengaging connector loop 61 from projection 62. Knob 74 prevents connector loop 61 from slipping off projection 62 unless connection loop 61 is deformed and pried beyond knob 74 using a screwdriver or similar tool.

According to another preferred embodiment, strap 60 is provided with a plurality of projections 62 spaced apart from locking surface 85 along strap 60 at predetermined intervals for permitting strap 60 to be adaptable to tubular members of various diameters, strap 60 being severable at predetermined and specified locations for removing portions of strap 60 and corresponding projections 62 which exceed the requirements of the particular diameter of tubular members being secured.

According to another preferred embodiment, top surface 65 and end surfaces 82 have a roughened surface texture for providing "non-slip" surfaces thereby enhancing the ease with which strap 60 may be secured using a hand push.

According to another preferred embodiment, strap 60 is provided with an enlarged rib 86 adjacent the connector loop 61 for providing additional strength and stability a the point of engagement between connector loop 61 and projection 62.

According to another preferred embodiment, second tubular member 13 is provided with a plurality of O-rings 46 secured in spaced apart grooves 45 for providing redundant seals in pressure indented relation between inner wall 30 of first tubular member 12 and outer wall 48 of second tubular member 13 when tubular members 12 and 13 are telescopically engaged.

Other and further embodiments may be devised without departing from the spirit and scope of the appended claims.

I claim:

1. A tube coupling comprising: first and second tubular members; a bell end on the first tubular member; a pin end on the second tubular member; an annular ridge on each of said tubular members, said ridges being juxtaposed when said pin end of said second tubular member is inserted into said bell end of said first tubular member; a deformable band having a longitudinally extending groove formed therein; a connector loop on one end of said band; and a plurality of projections on the other end of said band, said projections being spaced at predetermined intervals along the length of said band, said connector loop and said projection cooperating to detachably secure said band to encircle said juxtaposed ridges such that said ridges extend into said longitudinally extending groove to prevent relative movement of said tubular members, said band being severable adjacent each of said projections for allowing said band to be adaptable to encircle and secure tubular members of varying diameters.

2. Coupling apparatus according to claim 1, said first tubular member comprising: a tubular body; a shoulder on said tubular body; annular barbs on said tubular body, said barbs being adapted to grippingly engage a resilient tube wall when an end of a resilient tube engages said shoulder, said bell end on the first tubular member being formed such that said shoulder is positioned between said bell end and said barbs.

3. Coupling apparatus according to claim 1, said second tubular member comprising: a tubular body; a shoulder on said tubular body; annular barbs on said tubular body, said barbs being adapted to grippingly engage a resilient tube wall when an end of a resilient tube engages said shoulder, said pin end on the second tubular member being formed such that said shoulder is positioned between said pin end and said barbs.

4. Coupling apparatus according to claim 3, said ridge on said first tubular member being formed on the periphery of the bell end of said first tubular member.

5. Coupling apparatus according to claim 4, said ridge on said second tubular member being formed on a one end of a collar and said shoulder being formed on the other end of the collar.

6. Coupling apparatus according to claim 1, said a pin end on said second tubular member having a circumferentially extending groove formed therein; and seal means in said annular groove.

7. Coupling apparatus according to claim 1, with the addition of a collar on said second tubular member, said annular ridge on said second tubular member being formed on one end of said collar and a shoulder being formed on the other end of said collar.

8. Coupling apparatus according to claim 1, said ridge on said first tubular member being formed on the periphery of the bell end of said first tubular member.

9. Coupling apparatus for detachably securing tubes having juxtaposed ridges comprising: a deformable band having a top surface and a corrugated bottom surface, said corrugated bottom surface having a longitudinally extending groove formed therein, said corrugated bottom surface being formed by a plurality of transversely extending ribs, said ribs being uniformly tapered and uniformly spaced longitudinally along said band; a connector loop at one end of said band; a plurality of projections spaced at predetermined intervals along said top surface adjacent the other end of said band; said connector loop and said projections cooperating to detachably secure said band to encircle juxtaposed ridges on tubes such that the ridges extend into said longitudinally extending groove to prevent relative movement of the tubes, said band being severable adjacent each of said projections for allowing said band to be adaptable to encircle and secure tubes of variable diameters.

10. Coupling apparatus according to claim 9, the tubes comprising: first and second tubular members; a bell end on the first tubular member; a pin end on the second tubular member; an annular ridge on each of said tubular members, said ridges being juxtaposed when said pin end of said second tubular member is inserted into said bell end of said first tubular member.

* * * * *